3,282,987
α-UREIDOOXYCARBOXYLIC ACIDS AND THEIR DERIVATIVES

Linus M. Ellis, Wilmington, Del., assignor to E. I. du Pont de Nemours and Company, Wilmington, Del., a corporation of Delaware
No Drawing. Filed June 29, 1962, Ser. No. 206,154
12 Claims. (Cl. 260—471)

This invention relates to, and has as its principal objects provision of, certain novel ureas useful in regulating plant growth, herbicidal compositions containing such ureas, and methods for preparing and employing the ureas and compositions.

The new ureas made available by this invention are α-ureidooxycarboxylic acids, characterized by the presence of the structure

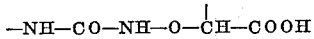
$$-NH-CO-NH-O-CH-COOH$$

and certain derivatives thereof. More specifically, the products of this invention are the α-ureidooxycarboxylic acids having the general formula (I) 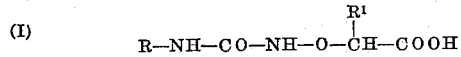
$$R-NH-CO-NH-O-\overset{R^1}{\underset{|}{C}H}-COOH$$

where R is hydrogen or a hydrocarbon or halohydrocarbon radical and $R^1$ is hydrogen or an alkyl radical; and the esters and salts of these acids.

The ureas of Formula I are prepared by reaction of isocyanic acid or an isocyanate, i.e., a compound of formula RNCO, with an α-aminooxyacid ester $$NH_2OCH(R^1)COOR^2$$

R and $R^1$ having the previously stated significance and —$COOR^2$ being a carbalkoxy group, in accordance with the equation

$$R-N=C=O + H_2N-O-\overset{R^1}{\underset{|}{C}H}-COOR_2 \longrightarrow$$

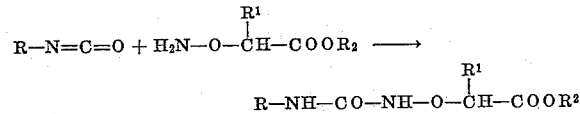
$$R-NH-CO-NH-O-\overset{R^1}{\underset{|}{C}H}-COOR^2$$

The α-ureidooxycarboxylic acid esters thus obtained can be converted to the free acids by alkaline hydrolysis, for example, with aqueous sodium or potassium hydroxide, followed by acidification of the resulting alkali metal salt. Other metal salts can be prepared from the free acids or from the alkali metal salts by conventional metathetical procedures.

The α-aminooxy acids which serve as the initial starting materials in this process can be prepared by methods described in the literature. In particular, an article by McHale, Green and Mamalis in J. Chem. Soc., 1960, 225, describes a number of these acids and their preparation by the hydrochloric acid hydrolysis of the corresponding benzoylaminooxycarboxylic acids. In this method, the α-aminooxy acids are usually obtained as their hydrochlorides (or half-hydrochloride in the case of α-aminooxyacetic acid, whose hydrochloride loses hydrogen chloride on crystallization). The same article describes the preparation of the methyl esters of the α-aminooxy acids by reaction with diazomethane. Other esters are obtained by reaction of the appropriate alcohol with the α-aminooxy acid or its hydrochloride in the presence of an acidic catalyst such as hydrogen chloride, followed by liberation of the ester from its hydrochloride by mild treatment with ammonia. This procedure will be illustrated later in detail in connection with some of the examples.

For practical reasons, the preferred products of this invention are the ureas corresponding to Formula I above, wherein R and $R^1$ are hydrogen or radicals, as defined, each of which has a total of 1 to 12 carbon atoms. Thus, R can be, for example, alkyl of 1 to 12 carbons or alkenyl of 2 to 12 carbons; cycloalkyl or cycloalkenyl of 5 to 12 carbons; or aryl, aralkyl, aralkenyl or alkaryl of 6 to 12 carbons, and these hydrocarbon radicals can have halogen, especially chlorine, substituents, preferably not exceeding two in number; and $R^1$ can be alkyl of 1 to 12 carbons. Of the derivatives of the above-defined α-ureidooxycarboxylic acids, the preferred ones, again for practical reasons, are the ammonium and monovalent or polyvalent metal salts, especially the alkali or alkaline earth metal salts; and the esters, preferably with alkanols of 1 to 12 carbons.

The ureas of this invention are in general crystalline solids. The metal salts are water-soluble but the other ureas are generally water-insoluble. They are, however, soluble in many common organic solvents. Solubility is most pronounced with the esters, the free acids being in general less soluble.

The products of this invention generically possess plant growth regulating activity, as shown by their ability to kill, or significantly retard the growth of, various grassy or broad leaved weeds and unwanted plants. Plant growth regulating compositions (hereinafter generally referred to for convenience as herbicidal compositions) where an essential active ingredient is a urea of the class defined above constitute therefore an important aspect of this invention.

The herbicidal compositions or formulations are prepared in the form of solids or liquids. Solid compositions are preferably in the form of dusts and are compounded to give homogeneous, free-flowing dusts by admixing the active compound with finely divided solids, e.g., talcs, natural clays, prophyllite, diatomaceous earth or flours such as walnut shell, wheat, redwood, soya bean, cottonseed flours and other inert solid conditioning agents or carriers of the kind conventionally employed in preparing pest control compositions in dust or powdered form.

Liquid compositions are prepared by admixing one or more of the ureas of this invention with a suitable liquid diluent, which need only have limited solvent power for the urea, or even none if the urea can be dispersed in the liquid medium. Most of the liquids conventionally used in preparing liquid herbicidal compositions are suitable for this purpose.

The herbicidal compositions, whether in the form of dusts or liquids, preferably also include a surface-active agent of the kind often referred to in the art as wetting, dispersing or emulsifying agents. These surface-active agents cause the compositions to be easily dispersed in water to give aqueous sprays, which in general are desirable compositions for application.

The surface-active agents employed can be of the anionic, cationic or nonionic type. They include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Sanitary Chemicals," August, September and October 1949. Generally, the surface-active agent need not constitute more than 5–15% by weight of the composition, depending on the particular surface-active agent, the system in which it is placed and the results desired. In some compositions, the percentage is 1% or less. The minimum lower concentration is usually 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in amount sufficient to exert the desired plant growth regulating action, but the amount of active compound present in the compositions as actually applied for destroying, preventing or controlling weeds will vary with the manner of application, the particular weeds for which control is sought, the purposes for which the application is made, etc. In general, the herbicidal compositions as applied in the form of a spray or dust contain from about 0.5% to about 85% by weight of the active urea or combination of active ureas.

Fertilizer materials, other herbicidal agents, and other pest control agents such as insecticides and fungicides can be included in the herbicidal compositions of this invention if desired.

The following examples illustrate the invention. In accordance with accepted nomenclature, the products of these examples are named as the respective carboxylic acids (or derivatives) and the ureidooxy function is expressed as a prefix. For greater clarity, the chain atoms of the ureido group are numbered 1, 2 and 3, the number 1 being assigned to the ureido nitrogen attached to the oxygen of the ureidooxy function. To illustrate,

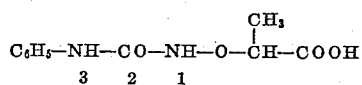

is named α-(3-phenylureidooxy)propionic acid.

*Example I.—Ethyl (3-phenylureidooxy)acetate*

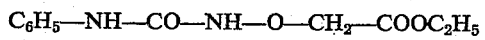

A. *Ethyl aminooxyacetate hydrochloride.*—Hydrogen chloride was passed into a stirred solution of 104 g. of aminooxyacetic acid half hydrochloride in 750 ml. of absolute alcohol to approximate saturation, with an attendant temperature rise to 60° C. An atmosphere of the gas was maintained over the reaction mixture while it was stirred at reflux for 0.5 hour. The solution was cooled, filtered to remove a small amount of solid, mixed with 250 ml. of benzene, and distilled to remove 750 ml. of solvent. An additional 250 ml. of absolute alcohol was added, and distillation was continued until almost all solvent was removed. On chilling, a solid separated as a pasty mass. The product was dissolved in warm t-butyl alcohol, and recovered by precipitation with several volumes of ether. The recovered solid (92 g.) was recrystallized from 90:10 tetrahydrofurane/absolute alcohol. Sixty-one grams of the hydrochloride of ethyl aminooxyacetate was obtained. After drying over potassium hydroxide in an evacuated desiccator this melted at 112–113° C.

*Analysis.*—Calc'd for $C_4H_{10}ClNO_3$: Cl, 22.79; N, 9.00. Found: Cl, 23.11; N, 9.36.

B. *Ethyl aminooxyacetate.*—A 300 ml. 3-neck flask equipped with a gas inlet, sealed stirrer, and reflux condenser with a potassium hydroxide-filled drying tube on the outlet, was flushed with dry nitrogen. Eight grams of ethyl aminooxyacetate hydrochloride and 100 ml. of anhydrous ether were placed in the flask and stirred while ammonia gas was bubbled in at a moderate rate. After 15 minutes, reaction was judged complete. To remove excess ammonia, a slow stream of nitrogen was passed through the apparatus for 15 minutes while the reaction mixture was stirred at reflux. Anhydrous ether was added to replace that lost by evaporation, and the suspension was filtered to remove ammonium chloride.

The free ester was not isolated. Its ether solution (the filtrate from the above-described operation) was considered to contain an amount of ethyl aminooxyacetate equivalent to the hydrochloride used (0.051 mole). It was used directly in the preparation of ethyl (3-phenylureiodooxy)acetate.

C. *Ethyl (3-phenylureidooxy)acetate.*—To the stirred solution of ethyl aminooxyacetate prepared as described above was added 6.0 g. (0.05 mole) of phenyl isocyanate. There was an appreciable heat of reaction. The reaction mixture was then stirred at reflux for 25 minutes, chilled, and filtered. The ethyl (3-phenylureidooxy)acetate thus obtained was washed with ether and air-dried. The product weighed 9.5 g., and melted at 88–88.3° C.

*Analysis.*—Calc'd for $C_{11}H_{14}N_2O_4$: C, 55.46; H, 5.92; N, 11.76. Found: C, 55.31; H, 5.75; N, 11.89.

*Example II.—Ethyl [3-(3,4-dichlorophenyl)ureidooxy] acetate*

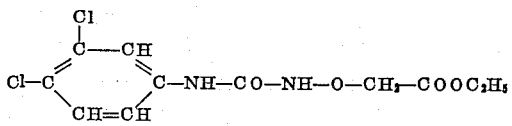

Eighty grams of a 22% solution of 3,4-dichlorophenyl isocyanate in benzene was added with stirring to 132 ml. of ether solution containing 0.071 mole of ethyl aminooxyacetate. The mixture was then stirred at reflux for 0.25 hour (solid separated on heating), chilled, and filtered. The recovered solid was washed with ether, and dried. The ethyl [3-(3,4-dichlorophenyl)ureidooxy]acetate obtained weighed 16 g. It melted at 120.5–121.2° C.

*Analysis.*—Calc'd for $C_{11}H_{12}Cl_2N_2O_4$: Cl, 23.09; N, 9.12. Found: Cl, 22.66; N, 9.26.

*Example III.—Ethyl [3-(4-chlorophenyl)ureidooxy] acetate*

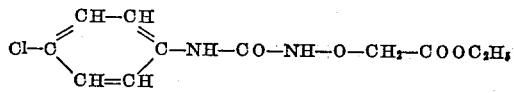

A solution of 13.8 g. of 4-chlorophenyl isocyanate in 50 ml. of anhydrous ether was added with stirring to 166 ml. of ether solution containing 0.09 mole of ethyl aminooxyacetate. The reaction mixture was stirred at reflux for 25 minutes. Solid did not separate during the heating operation, but separated when the reaction mixture was chilled. It was recovered by filtration, washed with ether, and dried. There was thus obtained 18 g. of ethyl [3-(4-chlorophenyl)ureidooxy]acetate, M.P. 112.2–112.8° C.

*Analysis.*—Calc'd for $C_{11}H_{3}ClN_2O_4$: Cl, 13.00; N, 10.27. Found: Cl, 13.20; N, 10.34.

*Example IV.—Ethyl (3-butylureidooxy)acetate*

A solution of 10.8 g. of butyl isocyanate was added with stirring to 200 ml. of ether solution containing 0.108 mole of ethyl aminooxyacetate. The resulting solution was stirred at reflux for 0.5 hour, and chilled. No solid separated, and the solution was evaporated to dryness to recover 23.8 g. of crude product. Five grams of this crude material was recrystallized from heptane to yield 4.5 g. of ethyl (3-butylureidooxy)acetate, M.P. 61.2–62° C.

*Analysis.*—Calc'd for $C_9H_{18}N_2O_4$: C, 49.53; H, 8.31; N, 12.84. Found: C, 49.69; H, 8.33; N, 13.25.

*Example V.—Ethyl ureidooxyacetate*

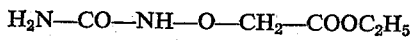

One hundred and fifty milliliters of ether solution containing 0.12 mole of ethyl aminooxyacetate was placed in a flask equipped with a stirrer and a reflux condenser with a calcium chloride drying tube on the outlet. The flask was cooled in a Dry Ice-acetone bath, and 42 milliliters of a Dry Ice-cooled ether solution containing 6 g. of isocyanic acid was added with stirring. The cooling bath was removed and the reaction mixture was stirred while it warmed to room temperature. After standing overnight the product was filtered, and the recovered solid was washed with ether and dried. The crude ethyl ureidooxyacetate weighed 18 g. and melted in the neighborhood of 125° C. Ten and one-half grams was recrystallized from tetrahydrofuran to obtain 8 g. of material melting at 123.6–124.2° C.

*Analysis.*—Calc'd for $C_3H_{10}N_2O_4$: C, 37.06; H, 6.22; N, 17.28. Found: C, 37.38; H, 6.28; N, 17.56.

*Example VI.—Ethyl α-ureidooxypropionate*

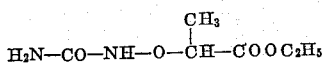

A. *Ethyl α-aminooxyproprionate hydrochloride.*—A solution of 72 g. of α-aminooxypropionic acid hydrochloride in 450 ml. of absolute alcohol was placed in a flask equipped with a gas inlet, stirrer, and reflux condenser with a calcium chloride drying tube on its outlet. The solution was stirred under an atmosphere of hydrogen chloride until approximately saturated with the gas, and then stirred at reflux for 0.5 hour. Alcohol was removed by distillation, first at atmospheric and then at reduced pressure, until a viscous residue was left. This solidified on standing overnight. It was broken up, dried several days in a vacuum desiccator over solid potassium hydroxide and recrystallized from 1:1 benzene/tetrahydrofuran. The ethyl α-aminooxypropionate hydrochloride weighed 62 g., and melted at 84.5–86° C.

*Analysis.*—Calc'd for $C_5H_{12}ClNO_3$: Cl, 20.91; N, 8.26. Found: Cl, 20.74; N, 8.55.

B. *Ethyl α-aminooxypropionate.*—Fifty-one grams of ethyl α-aminooxypropionate hydrochloride and 500 ml. of anhydrous ether were placed in a dry flask equipped with a gas inlet, stirrer, and reflux condenser with a potassium hydroxide-filled drying tube on its outlet. The suspension was stirred for 1 hour under an atmosphere of ammonia. The reaction mixture was then stirred at reflux for 0.5 hour while a slow stream of nitrogen was passed through the system to remove excess ammonia. Ether was added to replace that lost by evaporation, and the product was filtered to remove ammonium chloride. The solid was washed with anhydrous ether, which was added to the filtrate.

The free ester was not isolated. Its ether solution (the filtrate from the above-described operation) was considered to contain 0.3 mole of ethyl α-aminooxypropionate (equivalent to the amount of hydrochloride used in its preparation). Its volume was adjusted to 600 ml. and measured portions were used directly in the preparation of ethyl α-ureidooxypropionate and other esters.

C. *Ethyl α-ureidooxypropionate.*—Two hundred and forty milliliters of ether solution containing 0.12 mole of ethyl α-aminooxypropionate was placed in a flask equipped with a stirrer and a reflux condenser with a calcium chloride drying tube on the outlet. The flask was cooled in a Dry Ice bath, and 42 ml. of a Dry Ice-cooled ether solution containing 6 g. of isocyanic acid was added. The reaction mixture was stirred while it warmed to room temperature, allowed to stand overnight, and evaporated to dryness to recover the product. The crude ethyl α-ureidooxypropionate weighed 15.5 g. Recrystallization of 7.5 g. of this material gave 6 g. of product, M.P. 74.7–75.7° C.

*Analysis.*—Calc'd for $C_6H_{12}N_2O_4$: C, 40.87; H, 6.87; N, 16.43. Found: C, 40.84; H, 6.79; N, 16.43.

*Example VII.—Ethyl α-(3-phenylureidooxy)propionate*

A solution of 10.5 g. of phenyl isocyanate in 25 ml. of anhydrous ether was added with stirring to 180 ml. of ether solution containing 0.09 mole of ethyl α-aminooxypropionate. The mixture was stirred at reflux for 40 minutes. No solid separated on cooling. Solvent was removed by evaporation to recover 20 g. of an oil that solidified on standing. Thirteen grams of this oil was dissolved in hot methanol and chilled in Dry Ice. Separation of solid took place during 2–3 hours. The product was filtered in a Dry Ice-cooled sintered glass filter. After drying in air, the recovered ethyl α-(3-phenylureidooxy)propionate weighed 2.3 g., and melted to a slightly cloudy liquid at 48–49° C. It was further dried in a vacuum desiccator over solid potassium hydroxide.

*Analysis.*—Calc'd for $C_{12}H_{16}N_2O_4$: C, 57.13; H, 6.35; N, 11.11. Found: C, 58.27; H, 6.41; N, 11.60.

*Example VIII.—Ethyl α-[3-(4-chlorophenyl)ureidooxy]propionate*

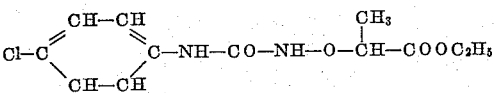

A solution of 13.8 g. of 4-chlorophenyl isocyanate in 25 ml. of ether was added with stirring to 180 ml. of an ether solution containing 0.09 mole of ethyl α-aminooxypropionate. The mixture was stirred at reflux for 40 minutes. Solvent was removed by evaporation to leave 22 g. of a liquid that gradually solidified on standing. Seven and eigh-tenths grams of this crude product was dissolved in hot methanol. The solution was chilled in Dry Ice to induce crystallization. Most of the solvent was removed from the Dry Ice-cooled mixture with a filter stick, after which the semisolid residue was transferred to a suction filter for removal of the balance of the solvent. The dry ethyl α-[3-(4-chlorophenyl)ureidooxy]propionate (5.5 g.) melted at 80–81° C.

*Analysis*—Calc'd for $C_{12}H_{15}ClN_2O_4$: Cl, 12.37; N, 9.77. Found: Cl, 12.54; N, 9.31.

*Example IX.—(3-phenylureidooxy)acetic acid*

Five grams of ethyl (3-phenylureidooxy)acetate was added to 100 ml. of boiling 6% sodium hydroxide solution. The solution was held at the boiling point for 3 minutes. Without isolating the resulting sodium (3-phenylureidooxy)acetate, the solution was cooled rapidly, acidified to about pH 2 with concentrated hydrochloric acid, and filtered. The recovered solid was washed with water and dried. The (3-phenylureidooxy)acetic acid thus obtained (4 g.) decomposed at 175.5° C. A sample recrystallized from 1:1 water/methanol also decomposed at 175.5° C.

*Analysis.*—Calc'd for $C_9H_{10}N_2O_4$: C, 51.43; H, 4.79; N, 13.36. Found: C, 51.53; H, 4.83; N, 13.32.

*Example X.—[3-(4-chlorophenyl)ureidooxy]acetic acid*

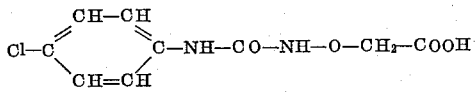

Nine grams of ethyl [3-(4-chlorophenyl)ureidooxy]acetate was dissolved in 180 ml. of boiling 6% sodium hydroxide solution. The mixture was held 4 minutes at the boil, chilled rapidly, made acid to pH 2 with concentrated hydrochloric acid and filtered. The recovered solid was washed with water and dried. The crude [3-(4-chlorophenyl)ureidooxy]acetic acid (8.5 g.) so obtained was recrystallized from 1:1 alcohol/water to obtain 6 g. of material that decomposed at 182° C.

*Analysis.*—Calc'd for $C_9H_9ClN_2O_4$: Cl, 14.50; N, 11.45. Found: Cl, 14.43; N, 11.53.

*Example XI.—[3-(3,4-dichlorophenyl)ureidooxy] acetic acid*

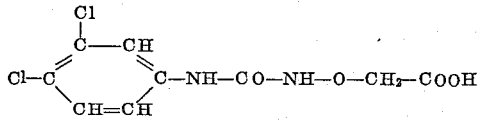

Ten grams of ethyl[3-(3,4-dichlorophenyl)ureidooxy]acetate was dissolved in 200 ml. of boiling 6% sodium hydroxide. The solution was held at the boil for 3 minutes, chilled rapidly, and made acid to pH 2–3 with concentrated hydrochloric acid. The solid that separated was collected on a filter, washed with water, and dried. The crude [3-(3,4-dichlorophenyl)ureidooxy]acetic acid (9.3 g.) thus obtained was recrystallized from 1:1 alcohol/water to yield 7:5 g. of product that decomposed at 193.5° C.

*Analysis.*—Calc'd for $C_9H_8Cl_2N_2O_4$: Cl, 25.41; N, 10.04. Found: Cl, 24.74; N, 10.26.

*Example XII.—α-(3-phenylureidooxy)propionic acid*

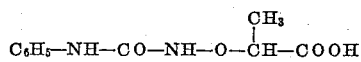

Ten grams of crude ethyl α-(3-phenylureidooxy)propionate was added to 100 ml. of 5% sodium hydroxide solution. A small amount of alcohol was added to promote wetting of the solid, and the mixture was warmed to 70° C. to effect substantially complete solution. A small amount of solid was removed by filtration, and the filtrate was chilled and acidified to pH 2 with concentrated hydrochloric acid. The solid that separated was collected on a filter, washed with water and dried. The crude product (8.5 g.) was recrystallized from 3:2 alcohol/water to yield 7.5 g. of recrystallized material that decomposed at 169–170° C. This product consisted essentially of α-(3-phenylureidooxy)propionic acid but elemental analysis indicated the presence of some impurities.

*Analysis.*—Calc'd for $C_{10}H_{12}N_2O_4$: C, 53.56; H, 5.39; N, 12.49. Found: C, 55.25; H, 5.59; N, 13.39.

*Example XIII.—α-[3-(4-chlorophenyl)ureidooxy] propionic acid*

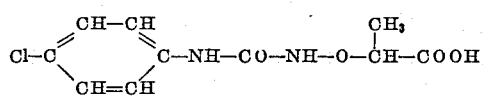

Ten grams of ethyl α-[3-(4-chlorophenyl)ureidooxy]propionate was mixed with 10 ml. of 5% sodium hydroxide containing a little alcohol to promote wetting, and the mixture was warmed to 70° C. A small amount of undissolved material was removed by filtration, and the solution was chilled and made acid to pH 2 with concentrated hydrochloric acid. The solid that separated was collected on a filter, washed with water, and dried. The crude α-[3-(4-chlorophenyl)ureidooxy)propionic acid (7.5 g.) was recrystallized from 3:2 alcohol/water to obtain 6.5 g. of product that, after drying at 75° C. for 3 hours in a vacuum oven, melted at 154–155.5° C.

*Analysis.*—Calc'd for $C_{10}H_{11}ClN_2O_4$: Cl, 13,71; N, 10.83. Found: Cl, 13.58; N, 10.54.

*Example XIV.—Methyl α-ureidooxypropionate*

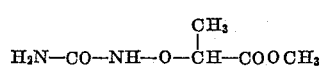

A. *Methyl α-aminooxypropionate hydrochloride.*—A mixture of 70 g. of α-aminooxypropionic acid hydrochloride in 500 ml. of methanol was stirred for 25 minutes under an atmosphere of hydrogen chloride. The mixture became hot enough to reflux, and was then approximately saturated with hydrogen chloride. Benzene (200 ml.) was added gradually to the reaction mixture while solvent was removed by distillation, the last portions being removed under reduced pressure while heating on a steam bath. Methanol (200 ml.) was then added to the residue and the solution was again approximately saturated with hydrogen chloride. Removal of the solvent by distillation left a slightly pasty solid which was dried under reduced pressure. The crude product (74 g.) was recrystallized from an 80:20 tetrahydrofuran/absolute ethanol mixture to give 55 g. of methyl α-aminooxypropionate hydrochloride, which melted at 132.5–133.5° C. after further drying in a vacuum oven at 60° C.

*Analysis.*—Calc'd for $C_4H_{10}ClNO_3$: C, 30.87; H, 6.48; N, 9.00. Found: C, 30.74; H, 5.98; N, 9.06.

B. *Methyl α-aminooxypropionate.*—A suspension of 47.5 g. of methyl α-aminooxypropionate hydrochloride in 300 ml. of dry ether was stirred for 0.75 hour while dry ammonia was introduced. The reaction mixture was then stirred at reflux for 20 minutes while a slow stream of nitrogen was being passed through the apparatus to remove excess ammonia. Ether was added to replace that lost by evaporation, and the mixture was filtered. The solid removed by filtration was washed with dry ether, which was added to the filtrate. The solution so obtained was considered to contain 0.3 mole of methyl α-aminooxypropionate.

C. *Methyl α-ureidooxypropionate.*—The above ether solution of methyl α-aminooxypropionate was treated, as described in Example VI–C, with 75 ml. of a Dry Ice-cooled ether solution containing 16.2 g. of isocyanic acid. The solid that separated was recovered by filtration, washed with ether and dried. The filtrate was evaporated to dryness and the residue was recrystallized from benzene. The two solid portions thus obtained were combined and recrystallized from an 8:1 benzene/heptane mixture, yielding 19.5 g. of methyl α-ureidooxypropionate, M.P. 73.5–74.5° C.

*Analysis.*—Calc'd for $C_5H_{10}N_2O_4$: C, 37.04; H, 6.22; N, 17.28. Found: C, 37.28; H, 6.15; N, 17.49.

*Example XV.—Methyl α-ureidooxycaproate*

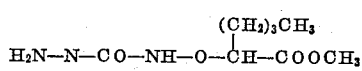

A. *Methyl α-aminooxycaproate hydrochloride.*—This was prepared essentially as described in Example XIV–A for the propionate ester. After recrystallization from a 2:1 heptane/benzene mixture, methyl α-aminooxycaproate hydrochloride melted at 84–85.8° C.

*Analysis.*—Calc'd for $C_7H_{16}ClNO_3$: C, 42.53; H, 8.16; N, 7.10. Found: C, 41.19; H, 7.95; N, 7.16.

B. *Methyl α-aminooxycaproate.*—The free ester was prepared, using essentially the procedure described in Example XIV–B, from 19.8 g. of methyl α-aminooxycaproate hydrochloride in 150 ml. of anhydrous ether.

C. *Methyl α-ureidooxycaproate.*—The ether solution of methyl α-aminooxycaproate was cooled in Dry Ice-acetone and treated with a Dry Ice-cooled solution of 5.4 g. of isocyanic acid in 25 ml. of ether. The reaction mixture was stirred while it warmed to room temperature, and it was then heated at reflux for 10 minutes. A small portion of the reaction mixture was evaporated to dryness, leaving an oil which solidfied on scratching with a glass rod. Addition of this solid to the main portion of the reaction mixture induced separation of a solid, which was collected by filtration, washed with ether, and air-dried. Additional product was obtained by evaporating the filtrate to dryness, dissolving the residue in benzene, and diluting the solution with 5 volumes of petroleum ether. The two solid portions were combined and crystallized from a 2:1 heptane/benzene mixture to yield 9.5 g. of methyl α-ureidooxycaproate, M.P. 95.9–96.9° C.

*Analysis.*—Calc'd for $C_8H_{16}N_2O_4$: C, 47.05; H, 7.90; N, 13.72. Found: C, 46.94; H, 8.24; N, 13.78.

Example XVI.—Sodium 3-phenylureidooxyacetate

C₆H₅—NH—CO—NH—O—CH₂—COONa

In 15 ml. of methanol containing 0.155 g. of sodium methylate was dissolved 0.6 g. of 3-phenylureidooxy-acetic acid. The solvent was then removed by evaporation on the steam bath, and the liquid residue was diluted with 20 ml. of absolute ethanol, then with a large volume of ether. Sodium 3-phenylureidooxyacetate separated as a gelatinous precipitate that was collected by filtration and dried. It had a neutralization equivalent, as determined by titration with perchloric acid in acetic acid solution, of 237 (Calc'd for $C_9H_9N_2NaO_4$, 232.2).

The foregoing detailed examples have illustrated certain specific α-ureidooxycarboxylic acids and their derivatives. However, the invention is not limited thereto, but is generic to the α-ureidooxycarboxylic acids defined by Formula I, their esters and their salts. These products can also be represented by the general formula (II)
$$R-NH-CO-NH-O-\overset{R^1}{\underset{|}{C}H}-CO-X$$

where R is hydrogen, hydrocarbon or halohydrocarbon and $R^1$ is hydrogen or alkyl (prefered embodiments of R and $R^1$ being as set forth previously) and X is one of the groups —$OR^2$, where $R^2$ stands for hydrogen or a hydrocarbon group, preferably of 1 to 12 carbon atoms and preferably alkyl, and —OM, where M stands for a metal cation, preferably an alkali or alkaline earth metal cation, or the ammonium cation.

Other illustrative examples of ureas of Formula II that can be prepared by the already described procedures are the compounds listed below, the name of each compound being followed for greater clarity by formulas identifying the radicals, R, $R^1$ and X.

(1) α-Ureidooxyisovaleric acid, methyl ester (R=H, $R^1$=—CH(CH₃)₂, X=—OCH₃)

(2) α-Ureidooxyoctanoic acid, n-butyl ester (R=H, $R^1$=—(CH₂)₅CH₃, X=—OC₄H₉)

(3) α-(3-methylureidooxy)tetradecanoic acid, potassium salt (R=—CH₃, $R^1$=—(CH₂)₁₁CH₃, X=—OK)

(4) (3-isobutylureidooxy)acetic acid, ammonium salt (R=—CH₂CH(CH₃)₂, $R^1$=H, X=—ONH₄)

(5) (3-n-dodecylureidooxy)acetic acid, sodium salt (R=—(CH₂)₁₁CH₃, $R^1$=H, X=—ONa)

(6) (3-allylureidooxy)acetic acid, isopropyl ester (R=—CH₂CH=CH₂, $R^1$=H, X=—OCH(CH₃)₂)

(7) (3-isopropenylureidooxy)acetic acid, ethyl ester (R=—C(CH₃)=CH₂, $R^1$=H, X=—OC₂H₅)

8) [3-(9-decenylureidooxy)]acetic acid, calcium salt (R=—CH₂(CH₂)₇CH=CH₂, $R^1$=H, X=—OCa₀.₅)

(9) α-(3-cyclopentylureidooxy)propionic acid

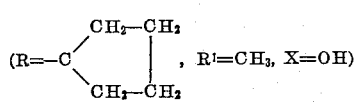, $R^1$=CH₃, X=OH)

(10) [3-(1-cyclohexenyl)ureidooxy]acetic acid, methyl ester

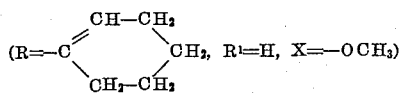, $R^1$=H, X=—OCH₃)

(11) [3-(2-decahydronaphthyl)ureidooxy]acetic acid, lithium salt

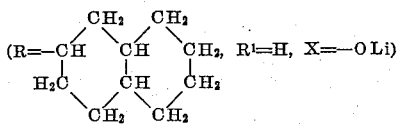, $R^1$=H, X=—OLi)

(12) α-[3-(2-chloroethyl)ureidooxy]butyric acid, n-hexyl ester (R=—CH₂CH₂Cl, $R^1$=—C₂H₅, X=—OC₆H₁₃)

(13) [3-(6-chlorohexyl)ureidooxyl]acetic acid (R=—(CH₂)₆Cl, $R^1$=H, X=—OH)

(14) α-(3-p-toylureidooxy)decanoic acid, n-dodecyl ester

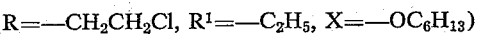, $R^1$=—(CH₂)₇CH₃, X=—O(CH₂)₁₁CH₃)

(15) [3-(1-naphthyl)ureidooxy]acetic acid, ammonium salt

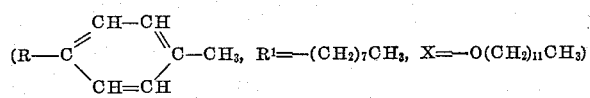, $R^1$=H, X=—ONH₄)

(16) [3-(4-biphenylyl)ureidooxyl]acetic acid

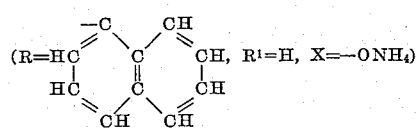, $R^1$=H, X=—OH)

(17) [3-(1 - phenylvinyl)ureidooxy]acetic acid, n - octyl ester $$\begin{array}{c}(R=\!\!-CH\!\!=\!\!CH_2, \ R^1\!\!=\!\!H, \ X\!\!=\!\!-O(CH_2)_7CH_3)\\ |\\ C_6H_5\end{array}$$

(18) α-(-benzylureidooxy)propionic acid, barium salt (R=—CH₂C₆H₅, $R^1$=—CH₃, X=—OBa₀.₅)

(19) [3-(4-chloro-m-tolyl)ureidooxy]acetic acid, potassium salt

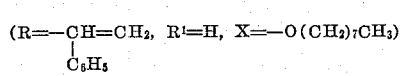, $R^1$=H, X=OK)

(20) [3-(5,8-dibromo-2-naphthyl)ureidooxy]acetic acid, ethyl ester

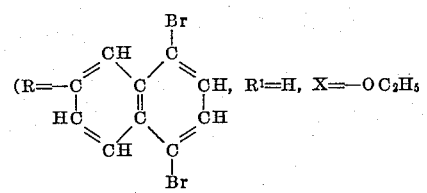, $R^1$=H, X=—OC₂H₅

As already mentioned, the compounds of this invention are generically useful as plant growth regulants. Specifically, they have utility for the control of perennial grasses and weeds in industrial areas, parking lots and the like. Rates of 4 to 30 pounds per acre as foliar-soil sprays give excellent control of established quack grass as well as Johnson grass seedlings. Rates of 6 to 20 pounds per acre as preemergence sprays control giant foxtail, pigweed and chickweed. Illustrative herbicidal compositions containing, as the active ingredient, two of the ureas of this invention, are descrbed below.

FORMULATION 1

This formulation contains, by weight:

| | Percent |
|---|---|
| Ethyl α-ureidooxypropionate | 50.0 |
| Mixed polyoxyethylene ethers and oil-soluble sulfonates | 2.0 |
| Calcined montmorillonite clay | 48.0 |

This mixture is dispersed in a conventional weed oil (a petroleum distillate with 50% or more of aromatics, boiling between 230–315° C.).

The above formulation is suitable for the control of annual broadleaf and grass weed infestation. Rates of 8 to 10 pounds of active ingredient (dispersed in 60 gallons of the weed oil) per acre are used. When applied as weeds are emerging, it gives good control of giant foxtail, pigweed, lambsquarters and chickweed.

FORMULATION 2

A mixture is prepared containing, by weight:

| | Percent |
|---|---|
| Ethyl ureidooxyacetate | 50.0 |
| Partially desulfonated sodium lignin sulfonate | 1.0 |
| Attapulgite clay | 49.0 |

This formulation is dispersed in water and sprayed onto a stand of quackgrass and Johnson grass seedlings. Rates of 15 to 25 pounds (active ingredient) applied in 80 gallons of water per acre give excellent weed control.

Additional tests on two other compounds of this invention showed that they also are effective growth retardants. Ethyl α-[3-(4-chlorophenyl)ureidooxy]propionate, when applied pre-emergence at 16 lb./acre, causes about 70% retardation of growth of black valentine bean plants, a typical test plant. Applied post-emergence, it causes about 60% retardation of growth at ½ lb./acre. In the pre-emergence tests, ethyl [3-(4-chlorophenyl)ureidooxy]acetate causes 80% retardation of growth of the bean plants at 16 lb./acre.

Since obvious modifications and equivalents in the invention will be apparent to those skilled in the chemical arts, I propose to be bound solely by the appended claims.

The embodiments of the invention in which an exclusive property or privilege is claimed are defined as follows:

1. α-Ureidooxycarboxylic acids having the formula $$R-NH-CO-NH-O-\overset{R^1}{\underset{|}{C}H}-COOH$$

wherein R is selected from the group consisting of hydrogen and hydrocarbon and chlorohydrocarbon of up to 12 carbons and R' is selected from the group consisting of hydrogen and alkyl of up to 12 carbons; and (1) the ammonium, alkali metal and alkaline earth metal salts of said acids and (2) the esters of said acids with alkanols of 1–12 carbons.

2. Ethyl ureidooxyacetate.
3. Ethyl α-ureidooxypropionate.
4. Ethyl α-[3-(4-chlorophenyl)ureidooxy]propionate.
5. Ethyl [3-(4-chlorophenyl)ureidooxy]acetate.
6. (3-phenylureidooxy)acetic acid.
7. [3-(4-chlorophenyl)ureidooxy]acetic acid.
8. α-(3-phenylureidooxy)propionic acid.
9. α-[3-(4-chlorophenyl)ureidooxy]propionic acid.
10. Methyl α-ureidooxypropionate.
11. Methyl α-ureidooxycaproate.
12. Sodium 3-phenylureidooxyacetate.

References Cited by the Examiner

UNITED STATES PATENTS

| | | | |
|---|---|---|---|
| 2,714,607 | 8/1955 | Matter | 260—471 |
| 2,820,814 | 1/1956 | Ginsberg | 260—471 |
| 2,906,773 | 9/1959 | Trapp | 71—2.6 X |
| 3,000,940 | 9/1961 | Raasch | 71—2.6 X |
| 3,035,910 | 5/1962 | Boyack et al. | 71—2.6 |
| 3,056,669 | 10/1962 | Moyle et al. | 71—2.6 |
| 3,060,235 | 10/1962 | Martin et al. | 71—2.6 X |
| 3,095,407 | 6/1963 | Brust | 71—2.6 X |
| 3,205,258 | 9/1965 | Simonian et al. | 260—519 |

LORRAINE A. WEINBERGER, *Primary Examiner.*

LEON ZITVER, R. K. JACKSON, *Examiners.*

M. S. JAROSZ, L. A. THAXTON,
*Assistant Examiners.*